United States Patent
deCler et al.

(10) Patent No.: US 6,848,602 B2
(45) Date of Patent: Feb. 1, 2005

(54) COUPLING AND CLOSURE APPARATUS FOR DISPENSING VALVE ASSEMBLY

(75) Inventors: Charles Peter deCler, Stillwater, MN (US); Robert K. Johnson, Blaine, MN (US)

(73) Assignee: Colder Products Company, St. Paul, MN (US)

(*) Notice: Subject to any disclaimer, the term of this patent is extended or adjusted under 35 U.S.C. 154(b) by 105 days.

(21) Appl. No.: 10/025,236

(22) Filed: Dec. 18, 2001

(65) Prior Publication Data

US 2002/0074533 A1 Jun. 20, 2002

Related U.S. Application Data

(60) Provisional application No. 60/256,406, filed on Dec. 18, 2000, and provisional application No. 60/305,096, filed on Jul. 13, 2001.

(51) Int. Cl.[7] .............................................. B65D 35/56
(52) U.S. Cl. ............. 222/153.07; 222/105; 222/153.14; 222/553
(58) Field of Search .......................... 222/105, 153.07, 222/153.14, 548, 553, 554

(56) References Cited

U.S. PATENT DOCUMENTS

| | | | | |
|---|---|---|---|---|
| 1,992,319 A | * | 2/1935 | Maggenti | 222/91 |
| 4,493,438 A | * | 1/1985 | Rutter | 222/83 |
| 4,516,691 A | | 5/1985 | Christine et al. | 222/83.5 |
| 5,111,970 A | * | 5/1992 | Rutter et al. | 222/83 |
| 5,251,791 A | * | 10/1993 | van Leer | 222/153.14 |
| 5,303,850 A | * | 4/1994 | Connan | 222/153.07 |
| 6,082,598 A | * | 7/2000 | Lee | 222/509 |

FOREIGN PATENT DOCUMENTS

| | | |
|---|---|---|
| EP | 331805 | 9/1989 |
| EP | 965559 A1 | 12/1999 |
| GB | 2 082 152 | 3/1982 |
| WO | 80/02546 | 11/1980 |

\* cited by examiner

Primary Examiner—Joseph A. Kaufman
(74) Attorney, Agent, or Firm—Merchant & Gould P.C.

(57) ABSTRACT

A fluid dispensing assembly for fluid dispensing and fluid transmission from a fluid source. The fluid dispensing assembly alone may dispense from a fluid source, or may be connected to a fluid dispensing system. The fluid dispensing assembly has a closure connected to a coupler. The closure includes fill through capabilities. The coupler is provided with a locking feature for preserving proper orientation and a closed position before being coupled to a piece of fluid dispensing equipment.

23 Claims, 23 Drawing Sheets

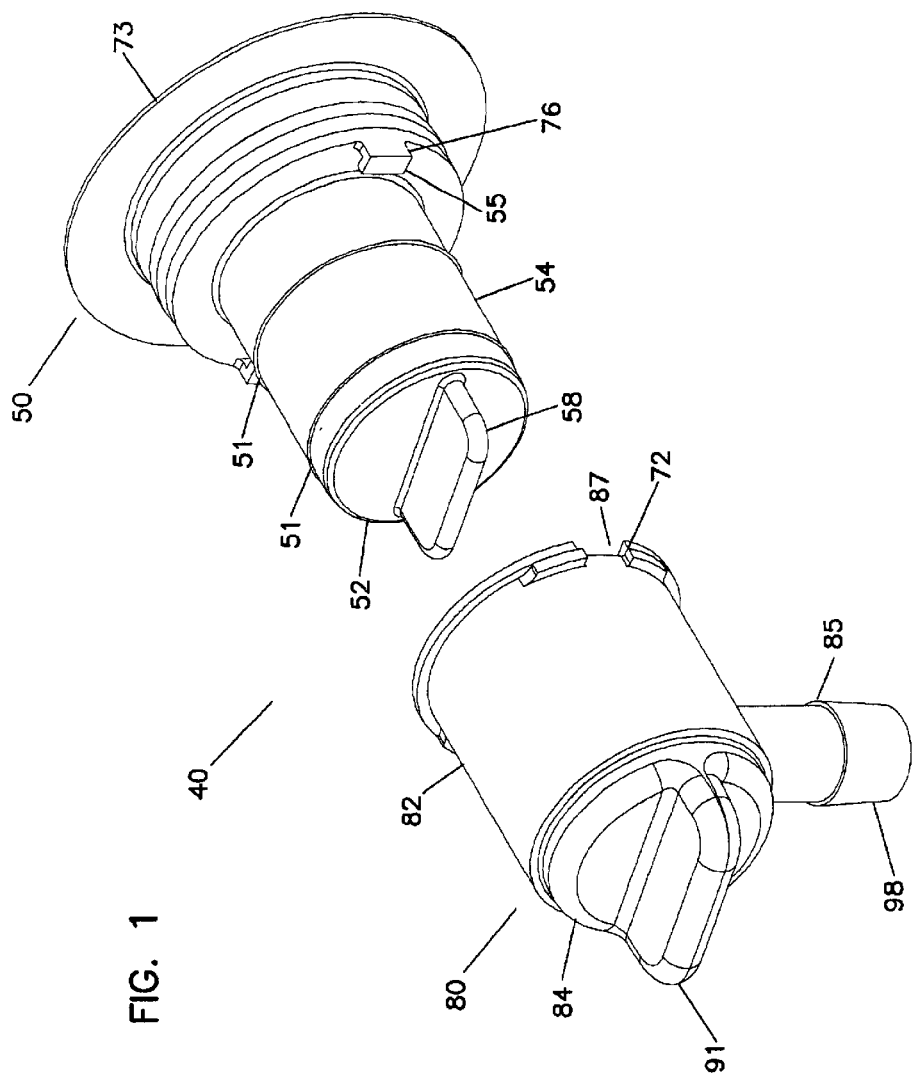

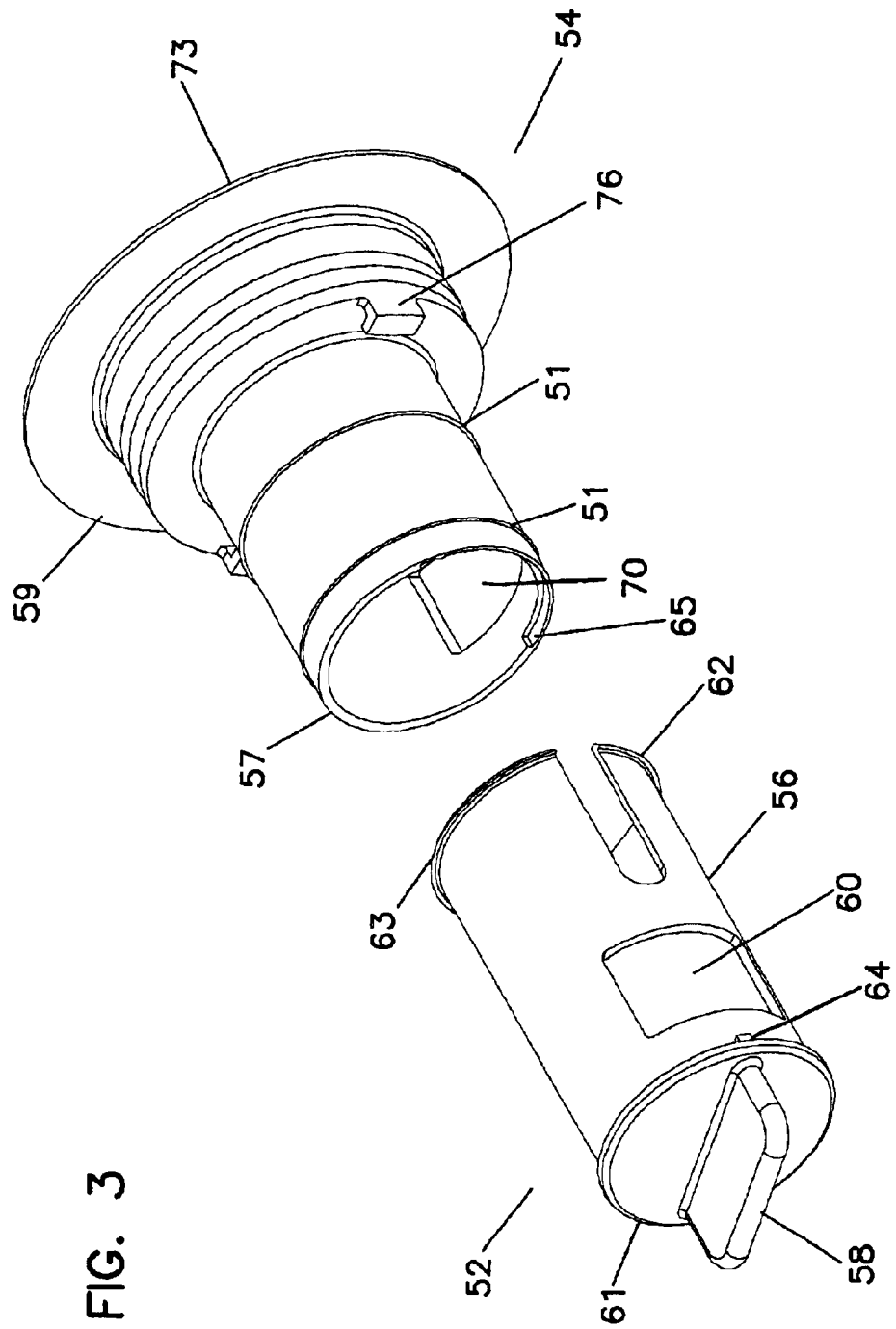

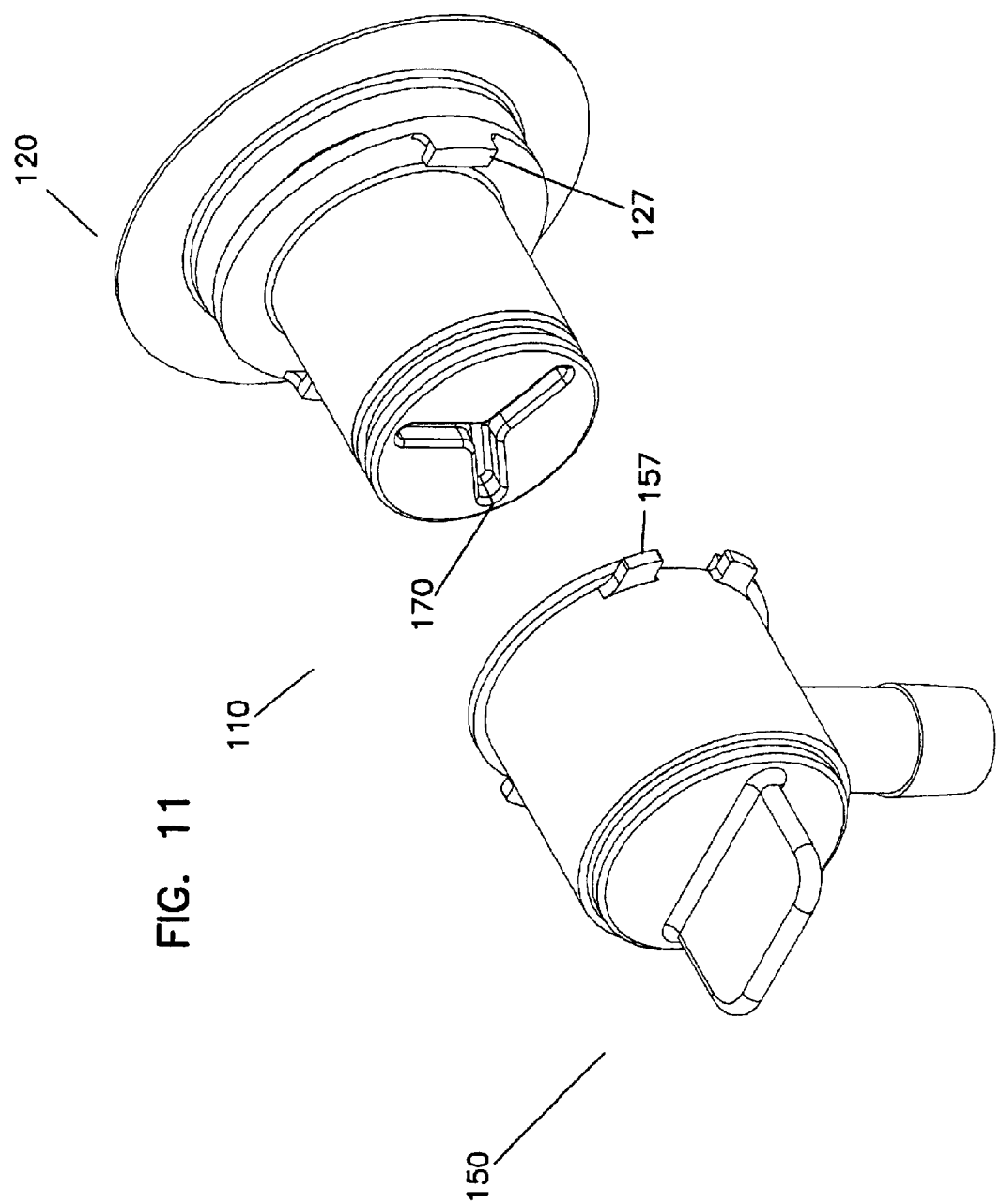

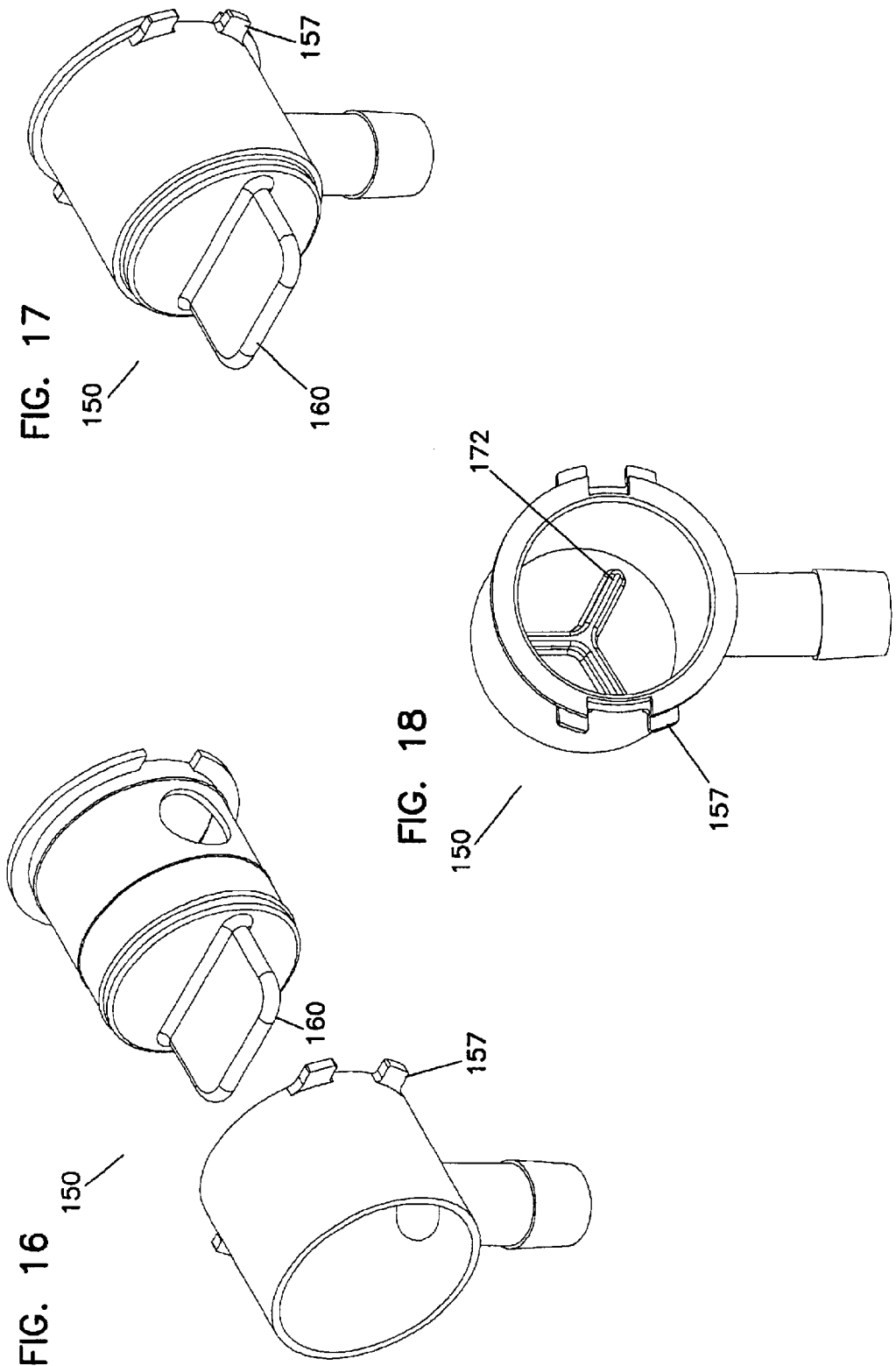

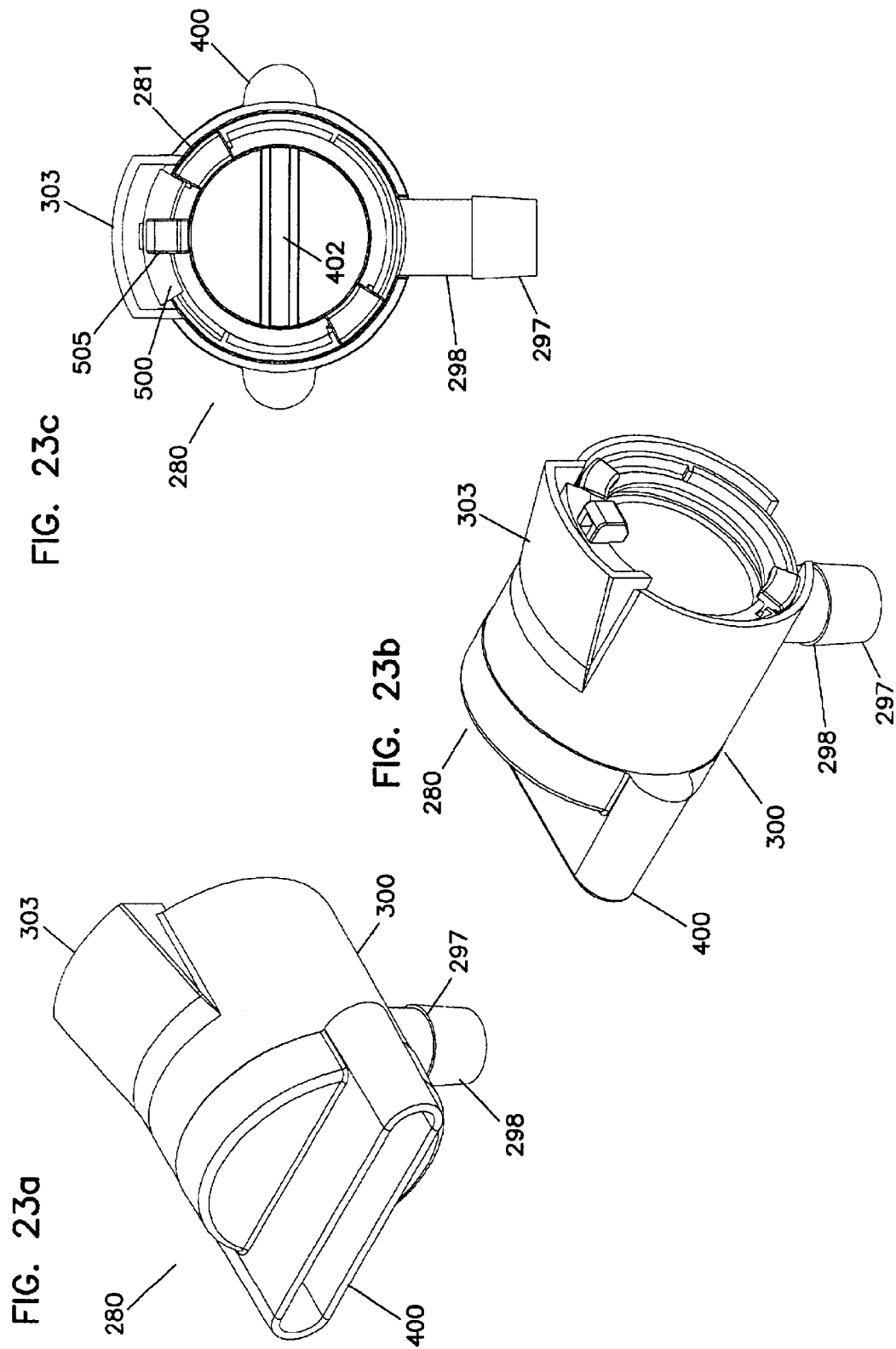

COUPLING AND CLOSURE APPARATUS FOR DISPENSING VALVE ASSEMBLY

This application claims the benefit of U.S. Provisional Application No. 60/256,406 filed Dec. 18, 2000, entitled FLUID COUPLING VALVE ASSEMBLY and U.S. Provisional Application No. 60/305,096 filed Jul. 13, 2001, entitled FLUID COUPLING VALVE ASSEMBLY, both of which are, in their entirety, incorporated herewith by reference.

FIELD OF THE INVENTION

This invention is related to a closure connected to a coupler. Particularly, this invention is related to a closure and a coupler used in a dispensing valve assembly.

BACKGROUND OF THE INVENTION

Dispensing valves are widely used in the foodstuffs industry, such as for dispensing condiments including for example, ketchups and mustards, or for dispensing other fluid like foods such as milk, or the like. Typically, a conventional coupling valve includes a first end and a second end to define a flow passage therethrough. The first end is connected to a fluid dispensing system, and the second end is used for fluid dispensing. By controlling a handle or lever of the coupling valve, the coupling valve is actuatable between an open configuration to allow fluid flow and a closed configuration to prevent fluid flow.

However, since the conventional coupling valves may include many parts made separately by using different materials, it is difficult to reduce the cost. Further, some conventional coupling valves experience leaking problems when the valves are in the closed position. Moreover, most dispensing valves only have dispensing function while lacking fill through capabilities. Therefore, there is a need to provide a dispensing system and coupling valve that will prevent leaking problems when the valve is intended to be in the closed position, such as during transport or other instances when not in use. In addition, there is a need to provide a dispensing valve that also can be used for filling a fluid source.

SUMMARY OF THE INVENTION

In accordance with the present invention the above and other problems were solved by providing a closure and a coupler for a dispensing valve assembly.

In one embodiment of the present invention a closure includes a closure valve rotatably connected with a closure body. The closure body has an opening corresponding to an opening of the closure valve. The closure body includes a first end and a second end. The first end includes a stop portion. The second end includes a fitment having a flange, wherein the flange seals and connects to a fluid source, and an interlock, wherein the interlock secures the closure to a coupler and prevents the closure from pulling apart from a coupler. The closure valve includes a first end and a second end. The first end includes a handle and a stop member that communicates with the stop portion of the closure body to provide proper rotation between the closure body and the closure valve. The closure body and the closure valve are connected to form a fluid tight seal.

In one embodiment, the closure becomes a fitment and may be integral with a fluid source, where a closure valve may be removed from the closure body to allow filling of a fluid source through the closure body and the fluid source being formed of integral one piece structure. The closure includes a diameter that allows filling of a fluid source through the closure body.

In one embodiment, the closure alone can be used by itself for fluid dispensing.

In one embodiment, the closure includes a receiving area so as to engage a locking member of a coupler, thereby releasing the locking member from a locked position and allowing the coupler and closure to be rotated into an open position when the coupler and the closure are connected.

In another embodiment of the present invention, a coupler includes a housing and a coupler valve, where the coupler valve is rotatably connected to the housing. The housing includes an opening corresponding with an opening of the coupler valve, and having an interlock, wherein the interlock secures the coupler to an interlock of a closure and prevents the coupler and a closure from pulling apart. The coupler may be attached to a fluid dispensing system. The coupler valve includes a first end and a second end. The first end having a handle that rotates the coupler valve relative to the housing. The second end includes a protruded edge with at least one gap so as to attach the coupler to a closure having an interlock. The housing and the coupler valve are connected to form a fluid tight seal.

In one embodiment, a coupler includes a shroud that surrounds a coupler and a closure. A handle may be separately attached to the coupler through an internal space of the handle that receives a handle projected outwardly from the coupler valve. The handle may be rotatably connected to the shroud, and may rotate the coupler valve relative to the shroud and the housing when actuating the coupler in an open or a closed configuration.

In one embodiment of the present invention, a locking member may be associated on a housing of a coupler. The locking member includes a protrusion that may cooperate with a receiving area of a closure so as to enable unlocking of the coupler when the coupler is attached to the closure.

In one embodiment, a coupler includes at least one stop member on a coupler valve that communicates with at least one stop portion on a housing to provide proper rotation of the coupler valve relative to the housing. The at least one stop member also communicates with a stop portion on a closure so as to provide proper rotation of the coupler valve and a closure. The at least one stop member contains an interlock that may interlock with a closure so as to secure connection between the coupler and a closure.

In another embodiment of the present invention, a dispensing valve assembly includes a closure and a coupler, wherein the closure is connected to a fluid source and the coupler is connected to a fluid dispensing system. The closure includes a closure valve rotatably attached and in a fluid tight seal with a closure body. The closure body has a side opening corresponding to an opening of the closure valve. The closure valve includes an end having a handle where the handle rotates the closure valve relative to the closure body. The coupler includes a housing and a coupler valve, where the coupler valve is rotatably attached to and in a fluid tight seal with the housing. The housing includes an opening corresponding with an opening of the coupler valve. The coupler valve includes an end having a handle where the handle rotates the coupler valve relative to the housing. The handle of the closure valve might be interlocked with an insert space of the handle of the coupler valve, such that the assembly may be actuated between an open configuration and a closed configuration. Each of the closure and the coupler includes an end having an interlock, wherein the interlocks prevent the closure and the coupler from pulling apart.

In one embodiment of the present invention, a dispensing valve assembly includes a closure where a closure valve may be removed from the closure body to allow filling of a fluid source through the closure. The closure may be oriented in-line with the fluid source, and includes a diameter that allows filling of a fluid source through the closure body.

In one embodiment of the present invention, a fluid dispensing assembly includes a closure and a coupler. The coupler may contain a locking member associated on a housing of the coupler that engages or communicates with a receiving area on the closure. The locking member includes a protrusion that may unlock the coupler so as to allow opening of the coupler when the coupler is attached to the closure. Similarly, the locking member may lock the coupler to prevent opening of the coupler when the coupler is not attached to a closure.

In one embodiment of the present invention, a fluid dispensing assembly may include a shroud that substantially surrounds a coupler and a closure. The closure includes a closure valve rotatably connected to and in a fluid tight seal with a closure body. The coupler includes a coupler valve rotatably connected to and in a fluid tight seal with a housing. A handle may be separately attached and in a fluid tight seal to the coupler. An internal space of the handle may receive a handle of the coupler valve projecting outwardly from the coupler valve. The closure may include a closure handle received by an internal space of the handle of the coupler valve. The handle may be rotatably connected to the shroud, and may rotate the coupler valve relative to the shroud and the housing, and rotate the closure valve relative to the closure body when actuating the assembly in an open or a closed configuration. A locking member associated on the housing may be biased against an inner surface of the shroud to prevent or allow rotation of the assembly.

The embodiments of the present invention offer many advantages. For instance, interlock features of the closure and the coupler allow for a secure connection of the fluid dispensing assembly preventing the closure and the coupler from pulling apart when in an open configuration. Also, the locking member feature allows opening of the coupler when the coupler is attached to the closure. Similarly, the locking member may lock the coupler to prevent opening of the coupler when the coupler is not attached to a closure. Further, the locking member locks the coupler in its uncoupled state and ensures proper orientation is preserved between the coupling and the closure in their closed positions. Locking the coupler in the closed position prevents air from being introduced into the dispensing system and from fluid draining from a line going to the coupling. The fluid dispensing assembly may be shut off to vacuum so as to prevent any leakage or spill of fluid or product. The in-line orientation of the closure and that the closure may be a part of the fluid source allows for the ability to fill from a bulk fluid supply through the closure attached to a portable fluid source and into the portable fluid source.

The features of the present invention provide an improved dispensing valve for applications such as food dispensing and delivery, for instance, in the dispensing of ketchups, mustards, and the like. Further, the present invention and its features provide a valve that can be conveniently used for filling on location before use and transport. The sealing and locking capabilities of the present invention provide a reliable dispensing valve.

Additional features and/or advantages of the invention will be set forth in part in the description which follows, and in part will be obvious from the description or may be learned by practice of the invention. It is to be understood that both the foregoing general description and the following detailed description are exemplary and explanatory only and are not restrictive of the invention.

BRIEF DESCRIPTION OF THE DRAWINGS

FIG. 1 is a isometric view of a fluid dispensing assembly according to one embodiment of the present invention.

FIG. 3 is a isometric view showing the elements of a closure in exploded relationship to one another according to one embodiment of the present invention.

FIG. 11 is a isometric view of a fluid dispensing assembly according to another embodiment of the present invention.

FIG. 16 is a isometric view showing the elements of a coupler in exploded relationship to one another according to another embodiment of the present invention.

FIG. 17 is a isometric view of a coupler in a closed position according to another embodiment of the present invention.

FIG. 18 is a rear view of a coupler according to another embodiment of the present invention.

FIG. 23a is a front isometric view of another embodiment of a coupler in accordance with the principles of the present invention.

FIG. 23b is a rear isometric view of the coupler in FIG. 23a.

FIG. 23c is a rear view of the coupler of FIG. 23a.

FIG. 23d is a rear exploded isometric view of the coupler in FIG. 23a.

FIG. 23e is a front exploded isometric view of the coupler in FIG. 23a.

DETAILED DESCRIPTION OF THE PREFERRED EMBODIMENT

Figure 2A:
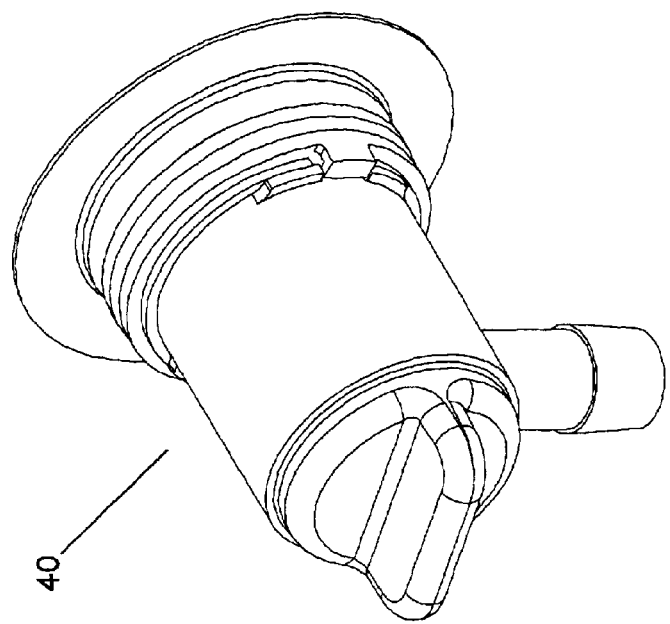
FIG. 2a is a isometric view of a fluid dispensing assembly in a closed position according to one embodiment of the present invention.

In the following description of the specific embodiments, reference is made to the accompanying drawings which form a part hereof, and in which is shown by way of illustration the specific embodiments in which the invention may be practiced. It is to be understood that other embodiments may be utilized as structural changes may be made without departing from the scope of the present invention.

This invention provides a fluid dispensing assembly for fluid dispensing and fluid transmitting from a fluid source to a fluid dispensing system. The fluid dispensing assembly has a closure connected to a coupler.

FIG. 1 illustrates a fluid dispensing assembly 40 according to one embodiment of the present invention. The fluid dispensing assembly 40 includes a closure 50 and a coupler 80 rotatably connected thereto. The closure 50 includes a closure body 54 and a closure valve 52 rotatably connected and forming a fluid tight seal.

Figure 2B:
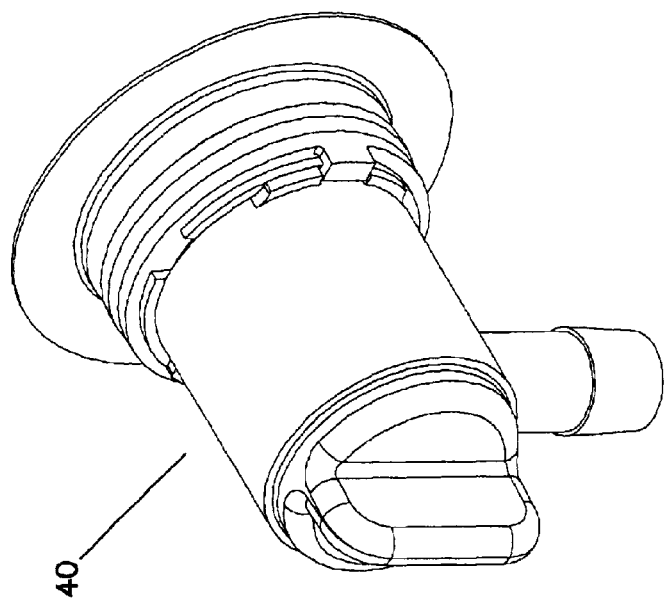
FIG. 2b is a isometric view of a fluid dispensing assembly in an open position according to one embodiment of the present invention.

The closure body 54 includes seals 51 which may be molded-in seals or O-ring seals. The coupler 80 includes a housing 82 and a coupler valve 84 rotatably connected and forming a fluid tight seal. The closure 50 may be provided with an interlock 76 and the coupler 80 may be provided with an interlock 72. Together the interlocks 76, 72 secure the closure 50 to the coupler 80, so as to prevent the closure 50 and the coupler 80 of the fluid dispensing assembly 40 from pulling apart when connected and in an open position, such as may occur during handling. The fluid dispensing assembly 40 is in the closed/precoupled position as shown in FIG. 2a, and is in the open/coupled position as shown in FIG. 2b.

Figure 5:
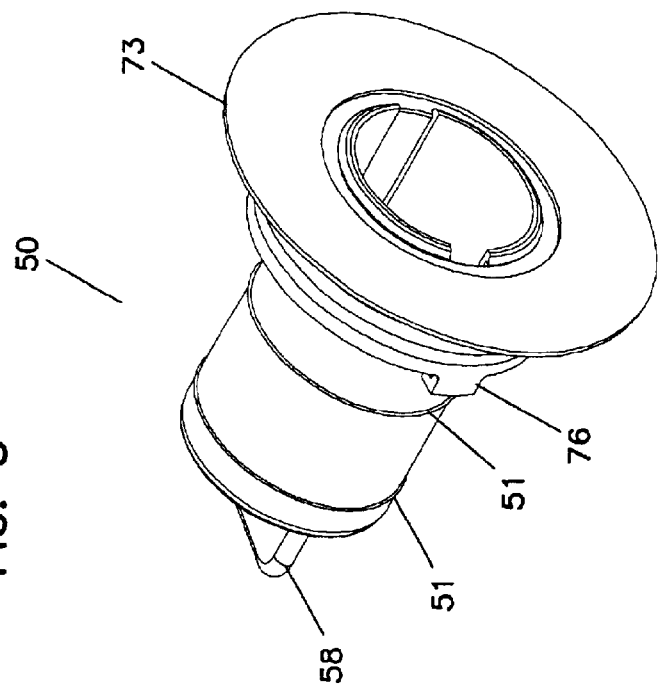
FIG. 5 is a rear isometric view of a closure according to one embodiment of the present invention.
Figure 4:
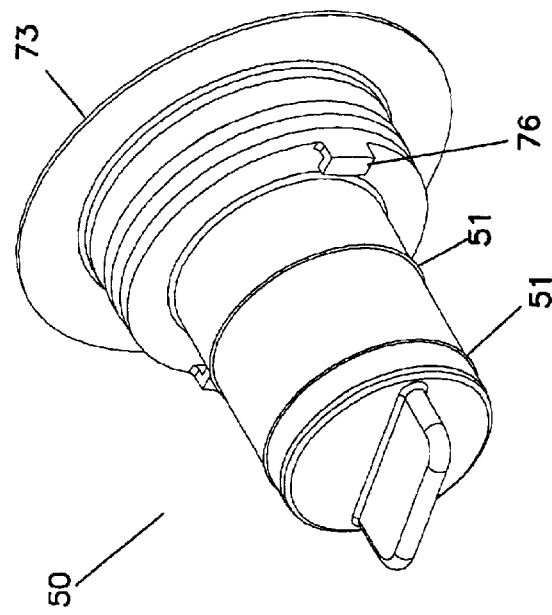
FIG. 4 is a isometric view of a closure in a closed position according to one embodiment of the present invention.

Turning now to FIG. 3, the closure 50 includes a closure valve 52 rotatably connected with a closure body 54. The closure body has a first end 57 and a second end 59. The closure valve also has a first end 61 and a second end 63. The closure body 54 has a side opening 70 corresponding to an opening 60 of the closure valve 52, and a neck portion 73 at the second end 59 for connecting to a fluid source. At the second end 59 of the closure body 54, the neck portion 73 may be a flange or a weld flange for making the closure body 54 a part integral with the fluid source. Further, the closure body 54 may be oriented in-line with the fluid source allowing the fluid source to be filled through the closure body 54. The outer surface of the closure body 54 may include seals 51 that may be molded-in or O-ring seals for connecting with the coupler 80. Alternately, the coupler may have a coupler valve which could have molded-in or O-ring seals which would cooperate with a smooth outer surface of the closure body 54 to form a fluid tight seal. The closure valve 54 further has a tubular portion 56 rotatably received in the closure body 54 and is in an interference fit with the inner surface of the closure body 54. The closure body 54 may be formed of a softer material such as a plastic. Preferably, the plastic may be a low density polyethylene. The closure valve 52 may be formed of a harder plastic material such that a suitable seal may be formed between the harder closure valve 52 and the softer closure body 54. The closure valve 52 includes a stop member 64 at the first end 61 that communicates with a stop portion 65 at the first end 57 of the closure body 54 to provide proper rotation between the closure body 54 and the closure valve 52. The tubular portion 56 has the side opening 60 corresponding to the side opening 70. When connecting the closure valve 52 with the closure body 54, a valve handle 58 at the first end 61 of the closure valve 52 can be actuated to rotate the closure valve 52 relative to the closure body 54 between an open configuration wherein the openings 60 and 70 are aligned, and a closed configuration wherein the openings 60 and 70 are not aligned, such that a wall of the tubular portion 56 blocks the opening 70 of the closure body 54. For example, FIG. 4 shows the closure 50 in the closed configuration. A snap portion 62 may be provided at the second end 63 of the closure valve 52 for securing the closure valve 52 into the closure body 54 (see FIG. 5).

Figure 7:
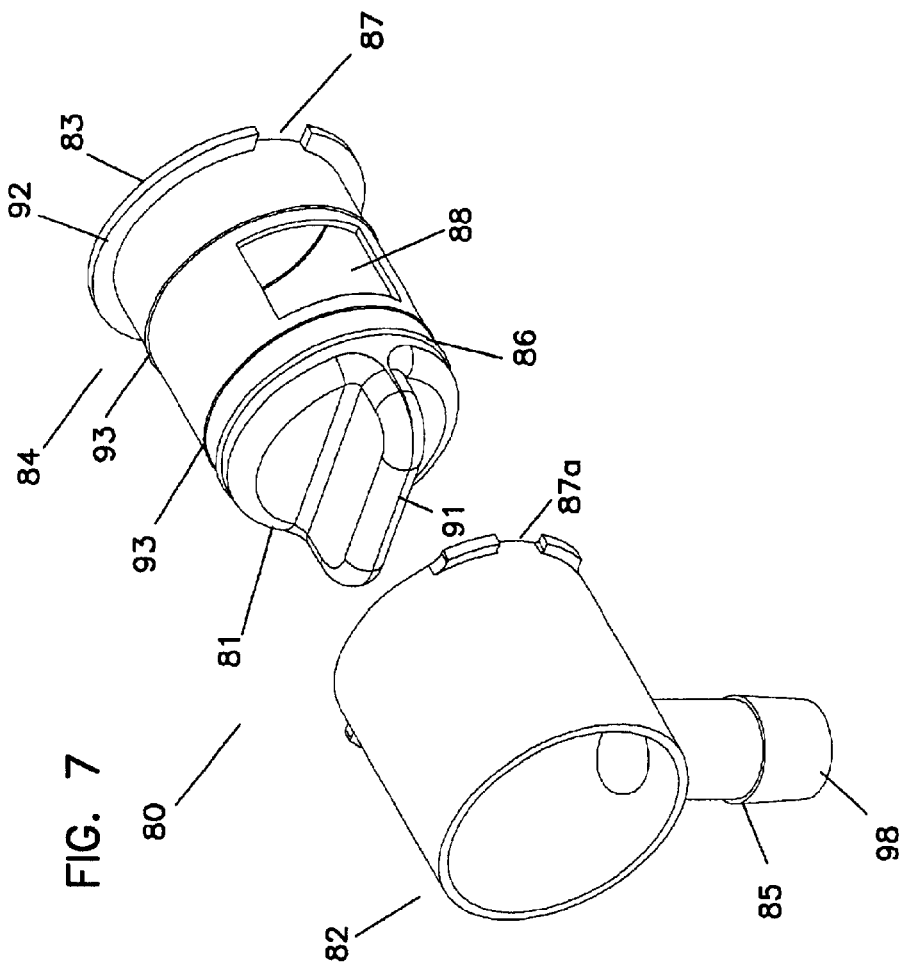
FIG. 7 is a isometric view showing the elements of a coupler in exploded relationship to one another according to one embodiment of the present invention.
Figure 6:
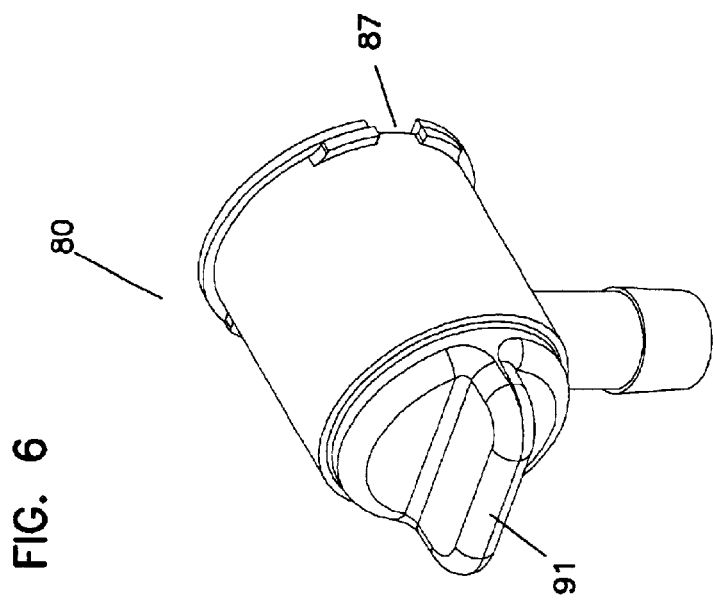
FIG. 6 is a isometric view of a coupler in a closed position according to one embodiment of the present invention.

FIGS. 6 and 7 show a coupler 80 according to one embodiment of the present invention. As seen in FIG. 7, the coupler 80 includes a coupler housing 82 and a coupler valve 84. The coupler valve 84 has a snap portion 86 and a coupler valve handle 91 at a first end 81 and a protruded edge 92 at a second end 83. The protruded edge 92 includes a gap 87 so as to allow connection with the closure having the interlock 76. The housing 82 includes a similar gap 87a so as to allow connection with the closure. The outer surface of the coupler valve 84 has seals 93 that may be molded-in or O-ring type seals for connecting with the inner surface of the coupler housing 82. The coupler valve 84 may be in an interference fit with the housing 82. The coupler housing 82 further has an outlet 98 for connecting to a fluid system. The outlet 98 may be an extended tubular portion having a barb 85 for connection to a fluid dispensing system, such as a fluid line. The coupler valve 84 includes an opening 88 corresponding to the opening of the outlet 98. The handle 91 may actuate the coupler valve 84 so as to rotate the coupler valve 84 to align the opening 88 with the outlet 98 in an open configuration. In a closed configuration, the handle 91 may be turned to rotate the coupler valve 84 so that an outer surface of the coupler valve 84 blocks the outlet 98. The assembly may be shut off to vacuum.

Figure 9:
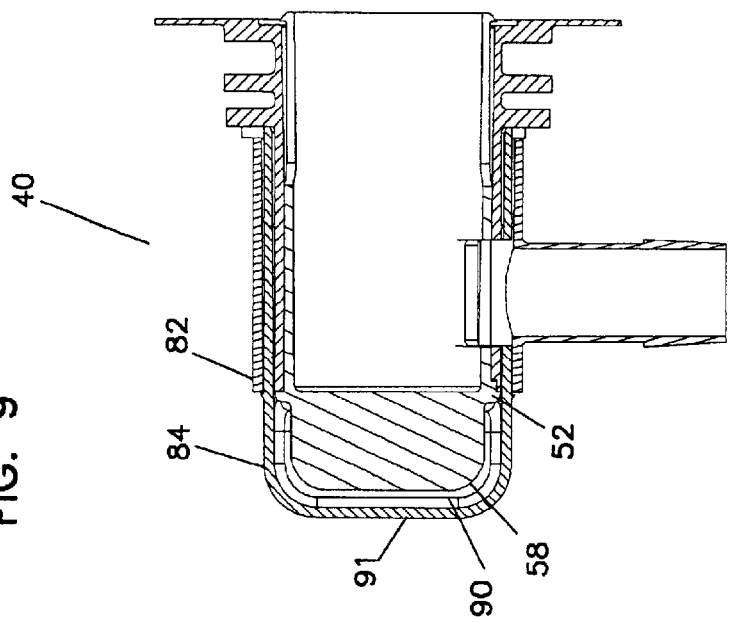
FIG. 9 is a cross-sectional view of the fluid dispensing assembly along line 9—9 of FIG. 8 according to one embodiment of the present invention.
Figure 8:
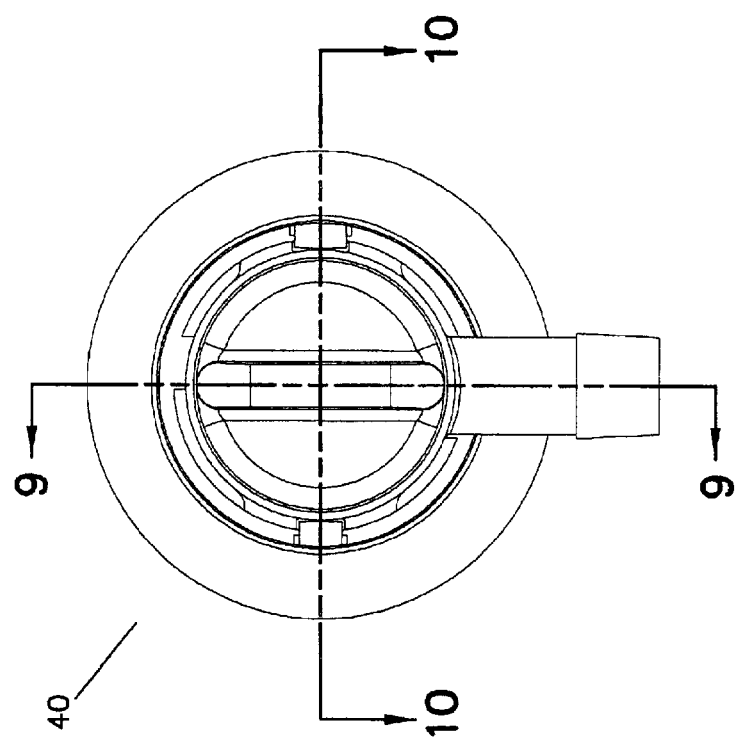
FIG. 8 is a front view of the fluid dispensing assembly according to one embodiment of the present invention.
Figure 10:
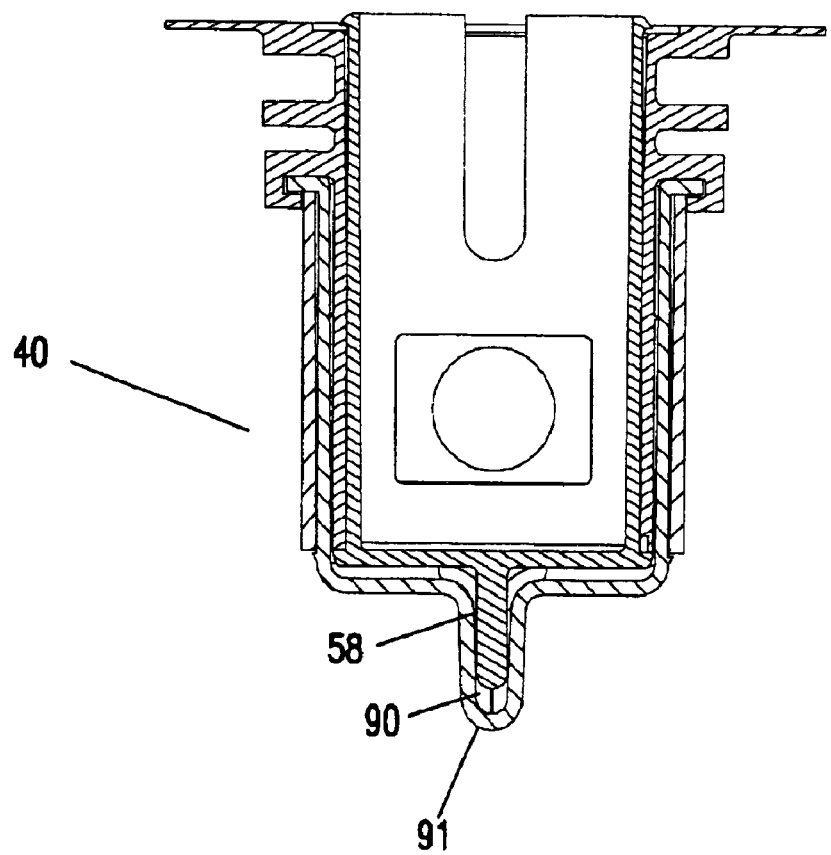
FIG. 10 is a cross-sectional view of the fluid dispensing assembly along line 10—10 of FIG. 8 according to one embodiment of the present invention.
Figure 12B:
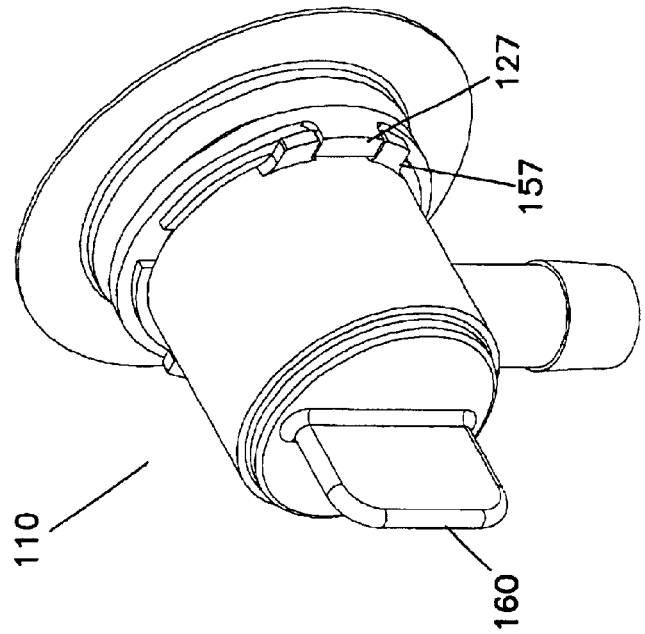
FIG. 12b is a isometric view of a fluid dispensing assembly in an open/coupled position according to another embodiment of the present invention.
Figure 12A:
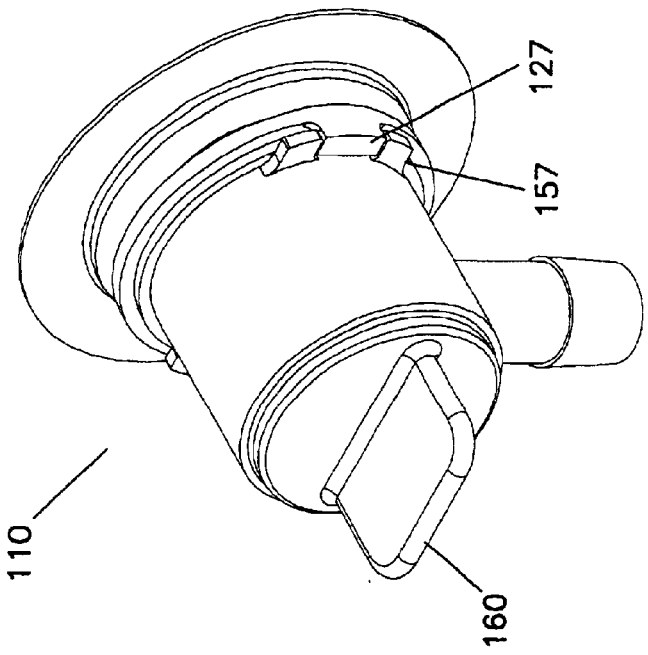
FIG. 12a is a isometric view of a fluid dispensing assembly in a closed/precoupled position according to another embodiment of the present invention.
Figure 13:
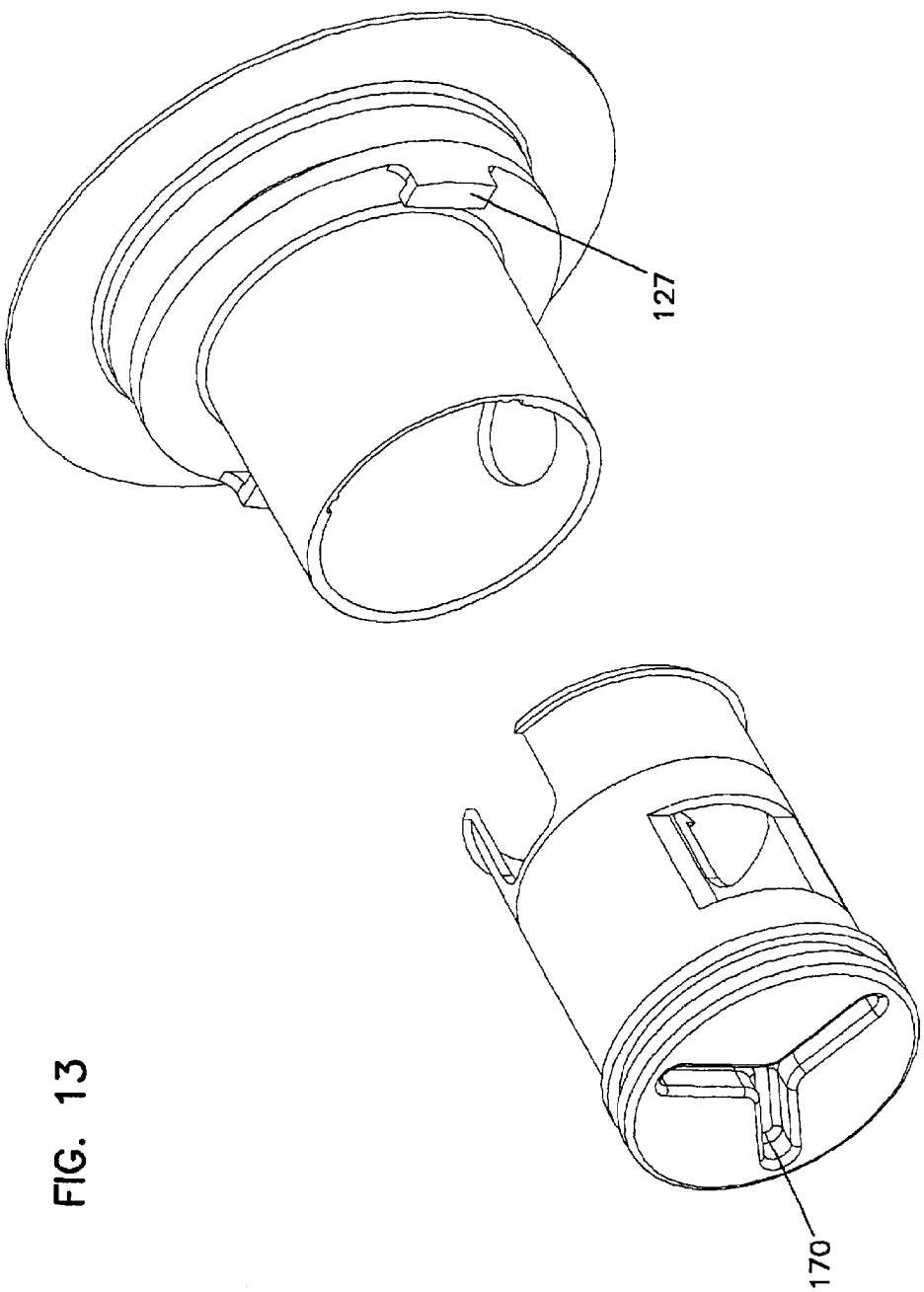
FIG. 13 is a isometric view showing the elements of a closure in exploded relationship to one another according to another embodiment of the present invention.
Figure 15:
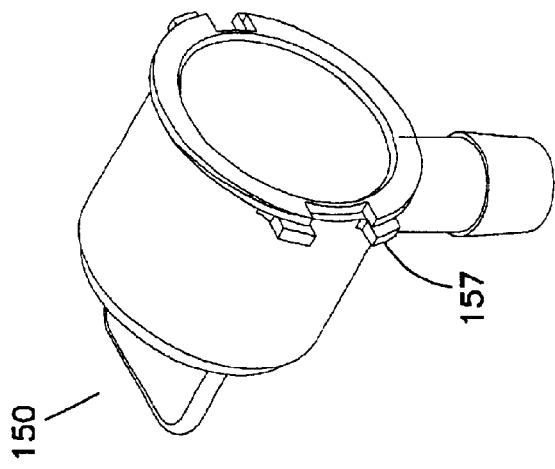
FIG. 15 is a rear isometric view of a closure according to another embodiment of the present invention.

When the closure 50 is connected with the coupler 80, the closure valve handle 58 interlocks with an internal space 90 of the coupler valve handle 91, as shown in FIGS. 8–10.

Figure 14:
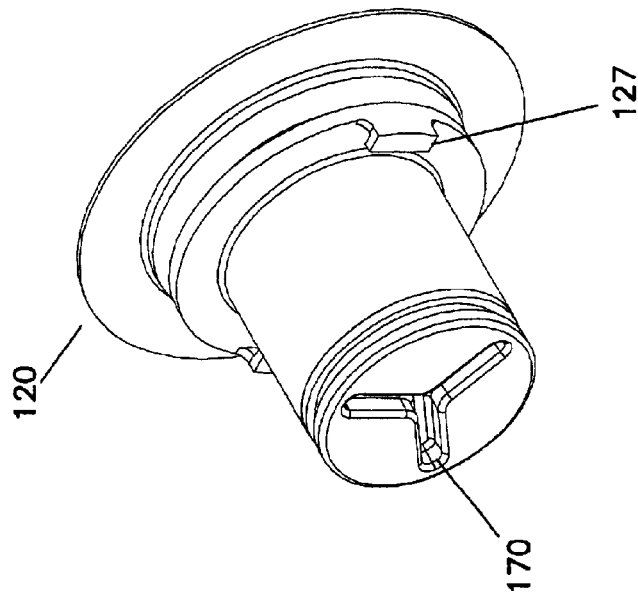
FIG. 14 is a isometric view of a closure in a closed position according to another embodiment of the present invention.

FIGS. 11–18 illustrate a fluid dispensing assembly 110 according to another embodiment of the present invention. The fluid dispensing assembly 110 includes a closure 120 and a coupler 150 each with an interlock feature 157, 127 as shown in FIG. 11. Different from the embodiment as discussed above, the fluid dispensing assembly 110 has additional interlock features 170, 172 as shown in the drawings (FIGS. 14 and 18). The coupler interlock 172 of the coupler 150 (see FIG. 18) is coupled with the closure interlock 170 (see FIG. 13 and FIG. 14), so that by actuating the coupler valve 160, the fluid dispensing assembly 110 can be in a closed position (FIG. 12a) or in an open position (FIG. 12b). With the exception of the interlock features 170, 172 described above, similar features illustrated in FIGS. 11–18 have already been detailed and will not be further discussed.

Figure 19:
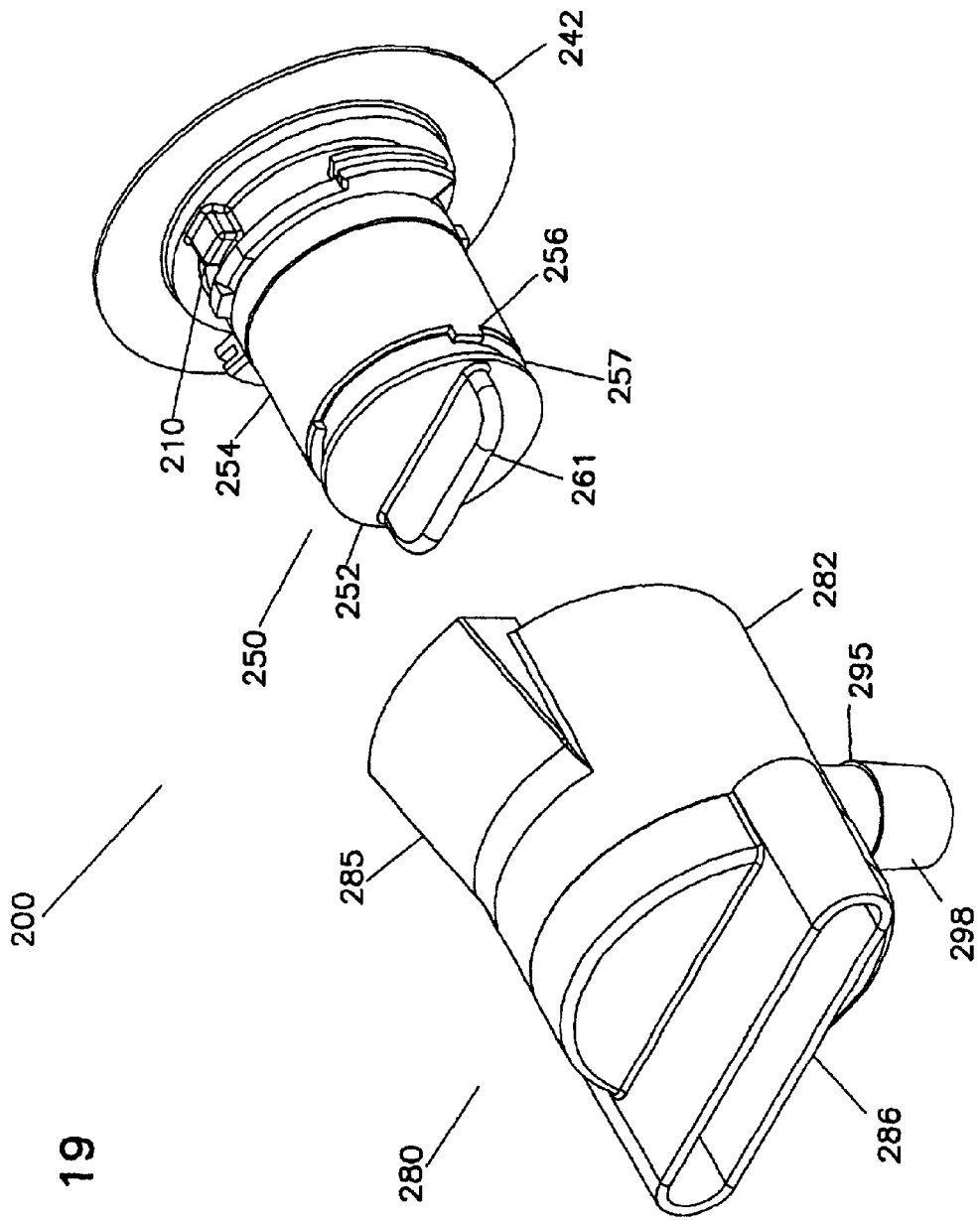
FIG. 19 is isometric view of another embodiment of a fluid dispensing assembly in accordance with the principles of the present invention.
Figure 20B:
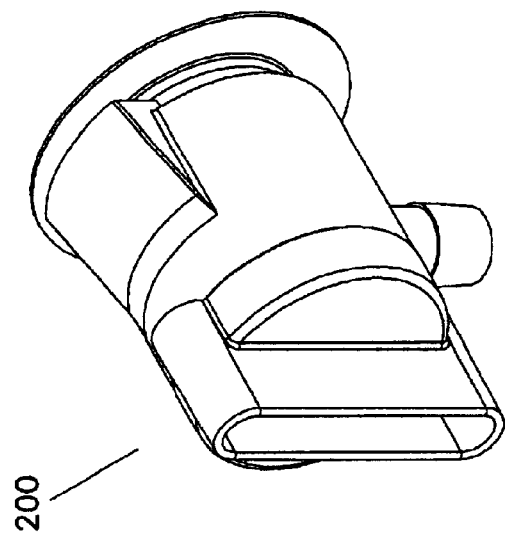
FIG. 20b is a isometric view of the fluid dispensing assembly of FIG. 19 in an open/coupled configuration.
Figure 20A:
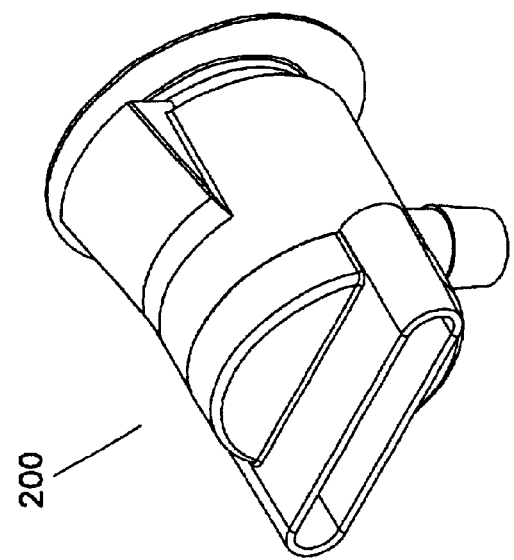
FIG. 20a is a isometric view of the fluid dispensing assembly of FIG. 19 in a closed/precoupled configuration.

FIG. 19 illustrates another embodiment of a fluid dispensing assembly 200 that includes a closure 250 and a coupler 280. FIGS. 20a and 20b show the fluid dispensing assembly in a closed and an open configuration, respectively.

Figure 21B:
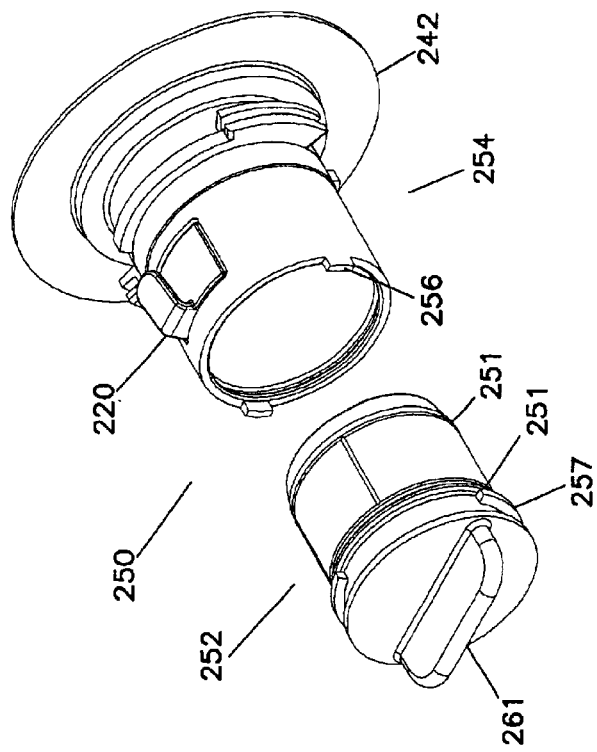
FIG. 21b is a isometric view of another embodiment of a closure in accordance with the principles of the present invention.
Figure 21A:
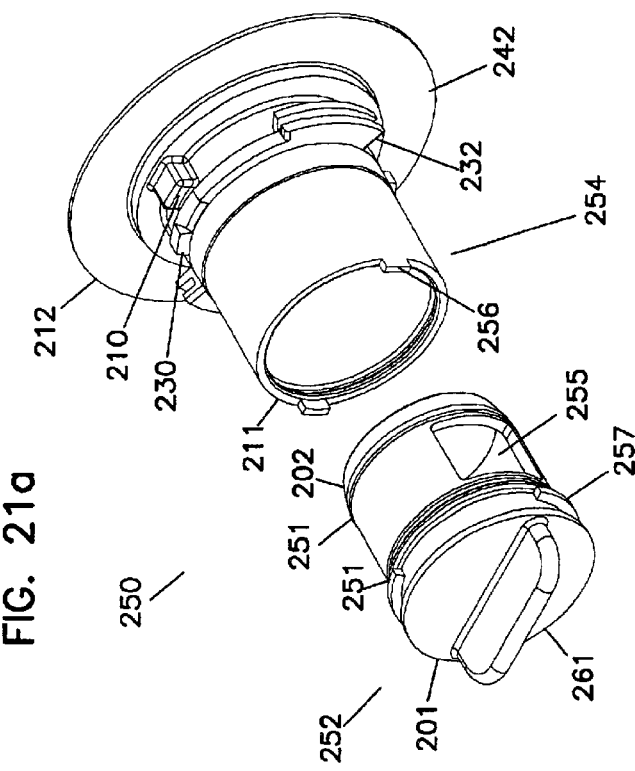
FIG. 21a is a isometric view of another embodiment of a closure in accordance with the principles of the present invention.

FIGS. 21a and 21b illustrate the closure 250 having a closure body 254 and a closure valve 252. The closure body 254 and the closure valve 252 form an interference fit by seals 251 which may be molded in or O-ring type seals. As above, the closure body 254 may be formed of a softer material such as a plastic material. Preferably, the plastic material may be a low density polyethylene. The closure valve 252 may be formed of a harder plastic material such that a suitable seal may be formed between the harder closure valve and the softer closure body. However, these materials are merely exemplary, as other materials may also be used. The closure valve 252 includes an opening 253 corresponding to an opening (not shown) of the closure body. A stop member 256 communicates with a stop portion 257 so as to provide proper rotation between the closure body 254 and the closure valve 252. A handle 261 is located at a first end 201 of the closure valve 252. The handle 261 actuates the closure valve 252 to an open or closed configuration rotating the closure valve 252 relative to the closure body. As above, the assembly may be shut off to vacuum.

A receiving area 210, which may be an activating ramp, may be located at a second end 212 of the closure body 254. The receiving area 254 engages a locking member of a coupler, thereby releasing the locking member and allowing the coupler and the closure, which are connected, to be rotated into an open position. The second end 212 of the closure body 254 also includes a neck portion 242 which may be a flange or a weld flange. The second end 212 also includes a stop 230 such that the stop 230 facilitates proper rotation when a coupler is attached. The interlock 232 prevents a coupler and the closure from pulling apart when in an open configuration.

Figure 26:
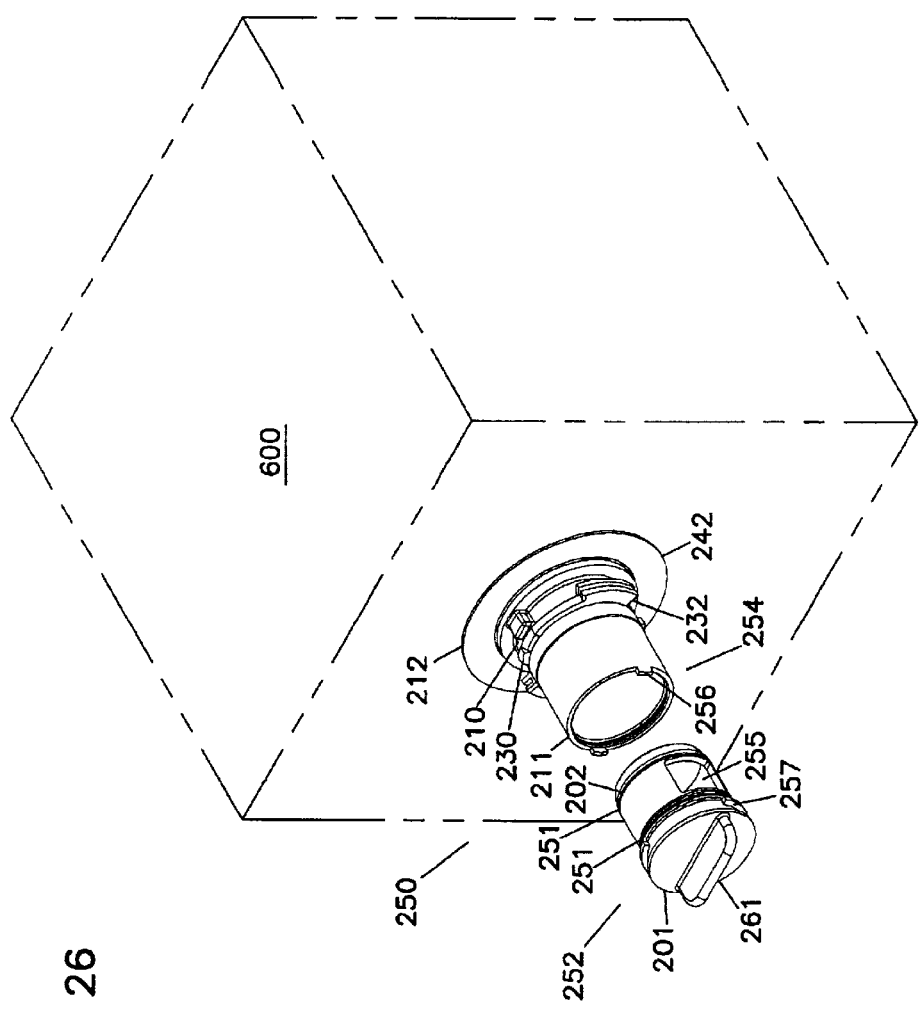
FIG. 26 is a isometric view of the closure of FIG. 21a attached to a fluid source in accordance with the principles of the present invention.

As illustrated in FIG. 26, the assembly of the closure body 254 and the closure valve 252 can be attached in-line as part of a portable fluid source 600, such that the closure valve 252 may be forcibly removed from the closure body 254 to allow for filling of the portable fluid source 600.

Figure 22B:
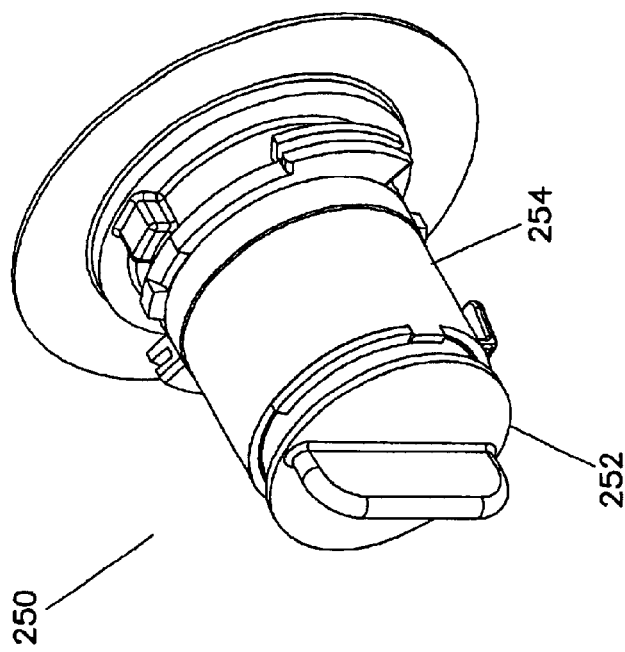
FIG. 22b is a isometric view of the closure of FIG. 22a in an open configuration.
Figure 22A:
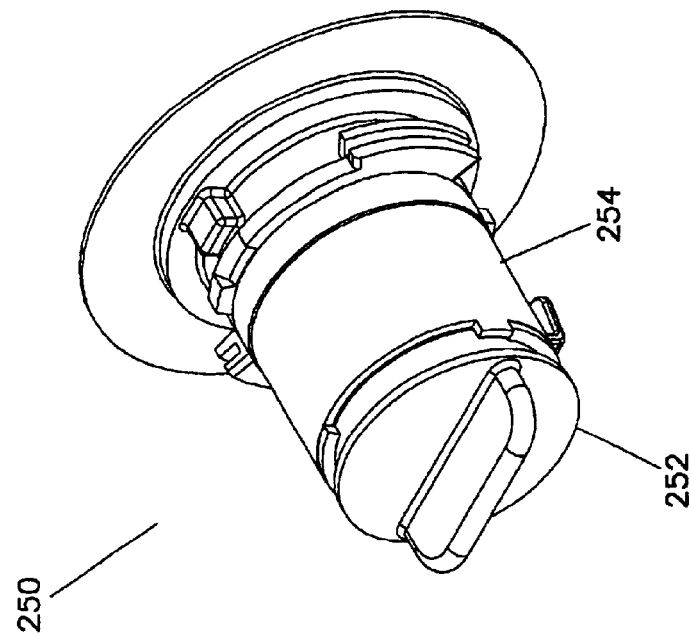
FIG. 22a is a isometric view of another embodiment of a closure in a closed configuration.

In FIG. 21b, a tear away seal 220 may be attached at the closure body to seal the closure before use. FIGS. 22a and 22b show the closure in a closed configuration and an open configuration.

Figure 23D:
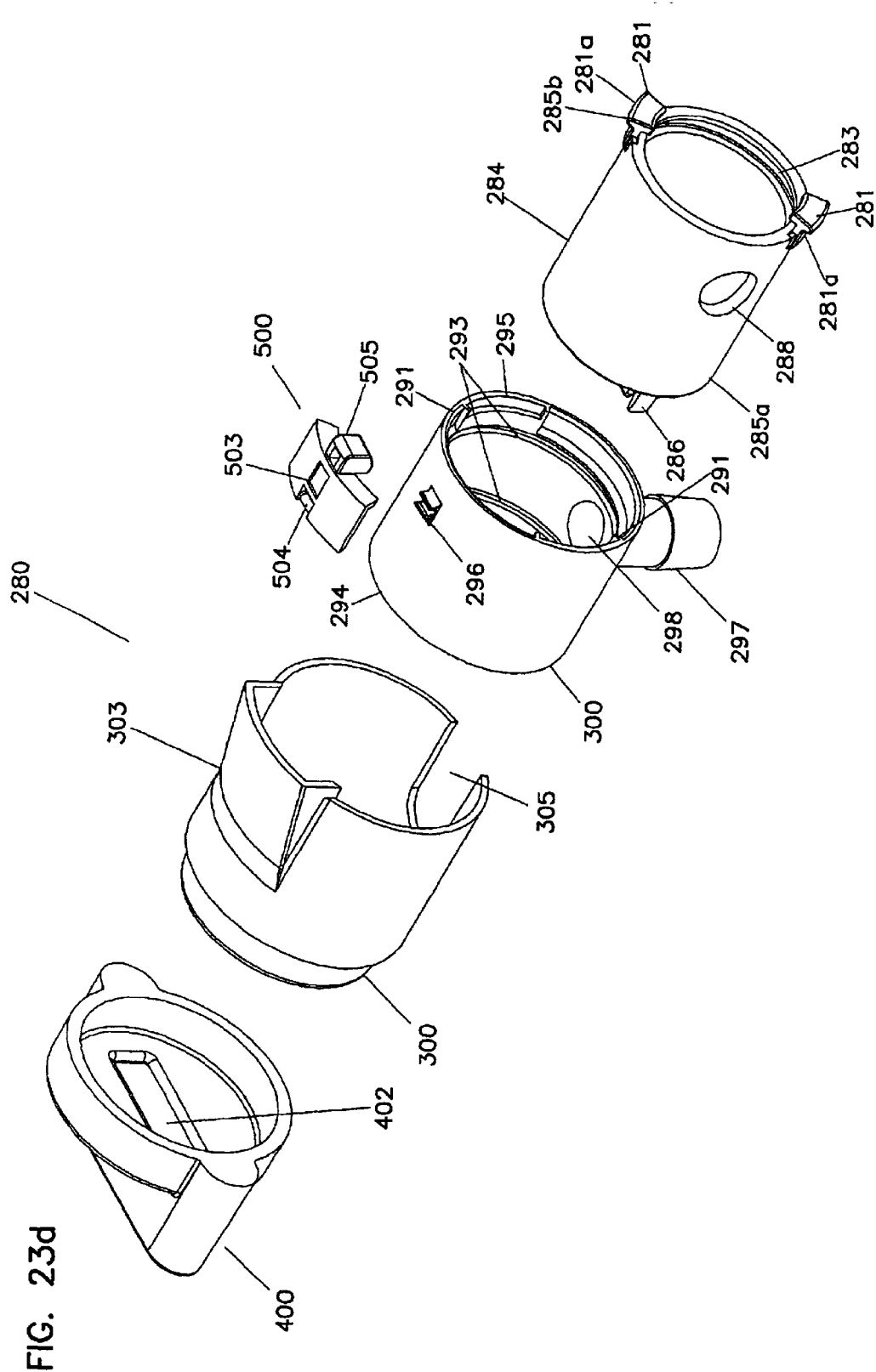
Figure 23E:
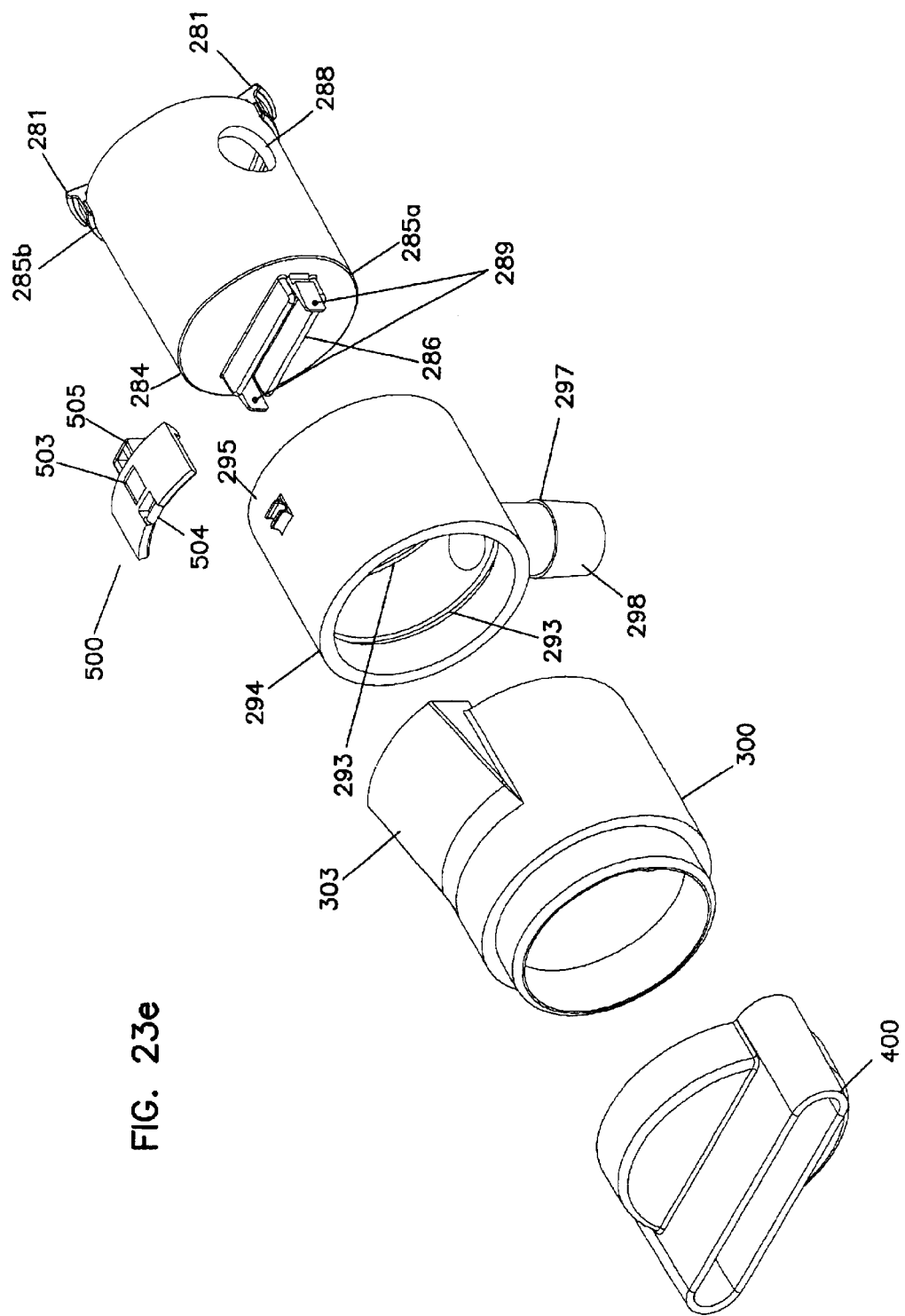
Figure 23F:
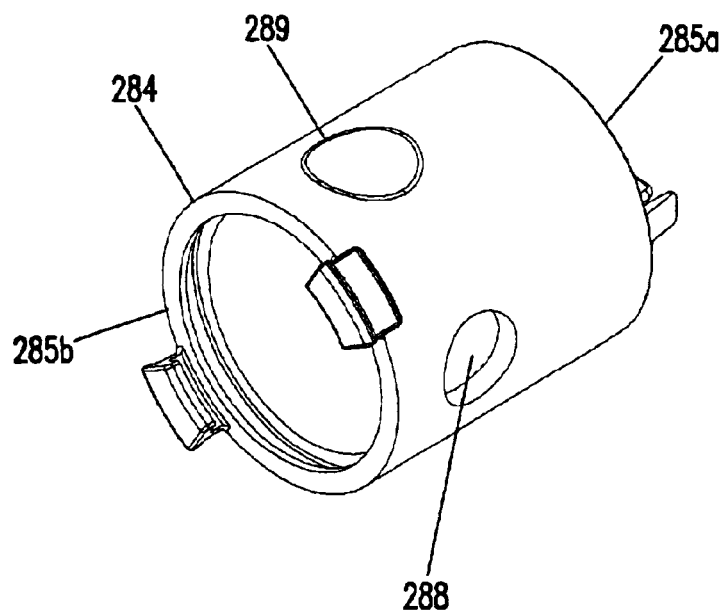
FIG. 23f is a rear perspective view one embodiment of a coupler valve in accordance with the principles of the present invention.

FIGS. 23a–23f illustrate the coupler 280 having a coupler housing 282 and a coupler valve 284. FIGS. 23a–23c show the coupler 280 in its assembled state. The coupler valve 284 is rotatably connected with the housing 282 forming a fluid tight seal with O-rings which may be on an interior surface of the housing (shown in FIG. 23d) or on the outer surface of the coupler valve 284 (not shown). As best shown in FIG. 23f, the coupler valve 284 may also have a seal 289 molded onto the outer surface of the coupler valve 284. The coupler valve 284 includes an opening 288 corresponding to an opening 298. A shroud 300 surrounds the housing 282 and the coupler valve 284. A handle 400 forms a fluid tight seal with the shroud 300. The handle 400 provides a means for rotating the coupler valve 284 relative to the housing 284 to actuate the coupler 280 in an open configuration and a closed configuration. In the open configuration the openings 298 and 288 are aligned creating a flow path, and in the closed configuration, the openings 298 and 288 are blocked by surfaces of the coupler valve 284 and the housing 282, respectively.

FIGS. 23d and 23e illustrate a more detailed view of the coupler 280. The housing includes a first end 294 and a second end 295. The second end 295 may be provided with at least one stop 291 that communicates with stops 281 of the coupler valve. The stops 291, 281 provide proper orientation between the housing 282 and the coupler valve 284. O-ring seals may be used in an internal surface of the housing for providing a proper fluid tight seal between the housing and the coupler valve. However, this is merely exemplary as O-ring seals may be used on an outer surface of the coupler valve 284. Other types of seals, such as molded in seals may also be used.

The housing 282 also includes a lock retainer 296 that retains a locking member 500. The locking member 500 prevents rotation of the coupler 280, when the coupler 280 is not connected to a closure, from being rotated out of a closed configuration. The locking member 500 may be released to allow opening of the coupler 280 when the coupler 280 is attached to the closure such as closure 250. Similarly, the locking member 500 may lock the coupler 280 to prevent opening of the coupler 280 when the coupler 280 is not attached to the closure 250. Particularly, the locking member 500 prevents the coupler valve 284 from rotating relative to the housing 282 into the open position. Further, the locking member 500 locks the coupler in its uncoupled state 280 and ensures proper orientation is preserved between the coupler 280 and the closure 250 in their closed positions. Locking the coupler 280 in the closed position prevents air from being introduced into the dispensing system and fluid from draining from a line going to the coupling. The locking member 500 may be, but is not limited to, a pivot lock. The locking member 500 includes a protrusion 505 that may contact a receiving area (such as 210 above) of a closure. In the coupled state, the protrusion 505 contacts the receiving area of the closure to release the locking member from blocking the stops of the coupler valve. As above, the receiving area 210 may be an activating ramp. The locking member 500 may be controlled with a spring 506 for biasing the locking member into locked and release configurations. The spring 506 may be but is not limited to a latch or leaf spring. The opening 298 may include an extended tubular portion 297 that may be barbed.

The coupler valve 284 includes a first end 285a and a second end 285b. The second end 285 may include an O-ring for providing a fluid tight seal when connected with a closure. Stops 281 have been described above, and may also communicate with a stop on a closure to provide proper rotation between the coupler valve and the closure body. The stops also include an interlock portion 281a such that the coupler 280 may be connected with a closure (such as 250)

thereby preventing the coupler 280 and a closure from pulling apart when in an open configuration.

The first end 285a includes at least one protrusion 286 that may have lock snaps 289. The protrusion 286 may be inserted into an internal space 402 of the handle 400. The lock snaps 289 secure connection with the handle 400. The handle 400 may be rotated thereby rotating the coupler valve 284 to actuate the coupler to an open configuration or a closed configuration. The protrusion 286 may contain its own internal space such that a handle from a closure may be inserted into the internal space of the protrusion 286 to interlock the handle 400 with a closure handle (such as 261). When the handle 400 is rotated, the handle 400 may simultaneously actuate a coupler and a closure to an open or a closed configuration. The handle when rotated in a closed position may shut a fluid dispensing assembly off to vacuum.

The handle 400 may be connected to a shroud 300 that surrounds the coupler 280 and the closure 250. The shroud may be provided with a ramp 303 to allow entry of the locking member 500, and also a groove 305 to allow the opening 298 to fit through. A biasing member 506 such as a leaf spring provides biasing for the locking member 500 to bias the locking member 500 in a normally locked configuration. When the locking member 500 is released by a receiving area 210 of the closure 250, the fluid dispensing assembly including the coupler 280 and the closure 250 may actuate into an open configuration.

Figure 24:
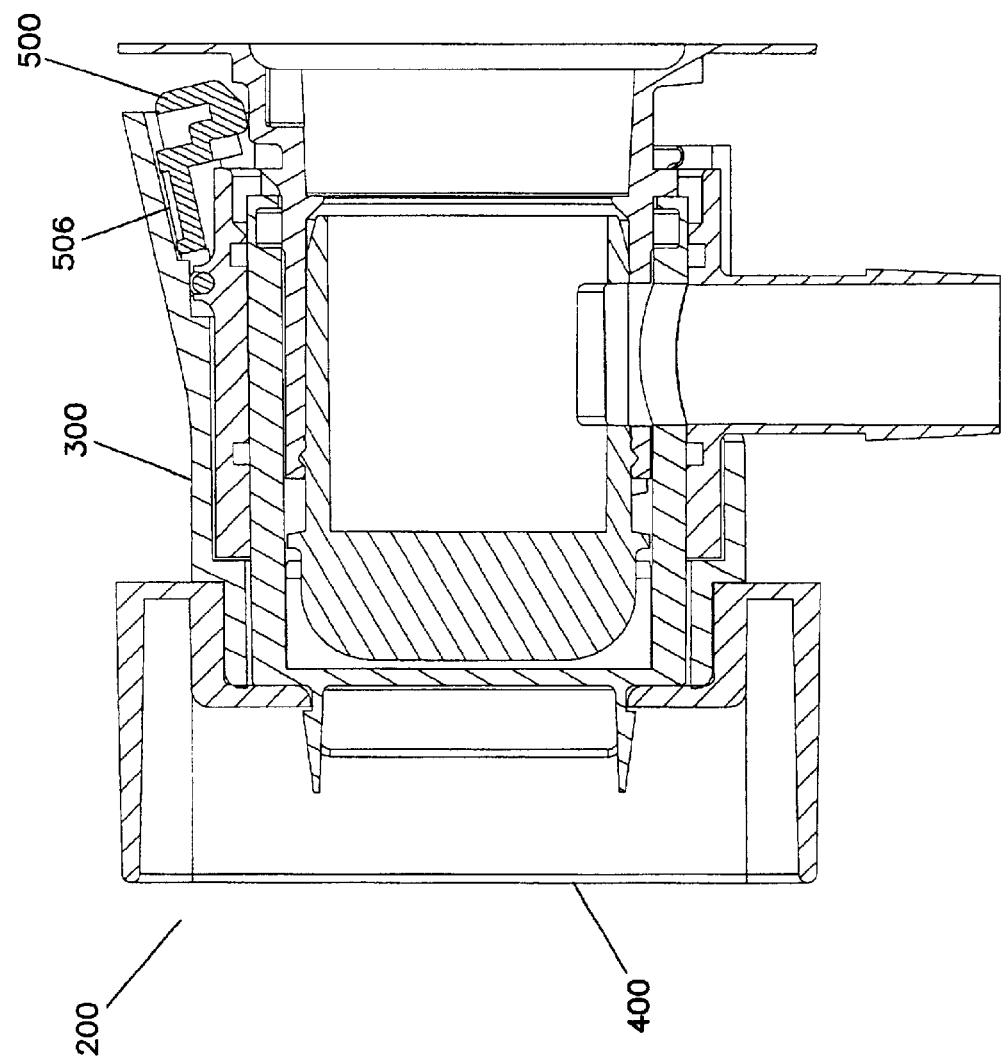
FIG. 24 is a side cross-sectional view of the fluid dispensing assembly of FIG. 19.
Figure 25:
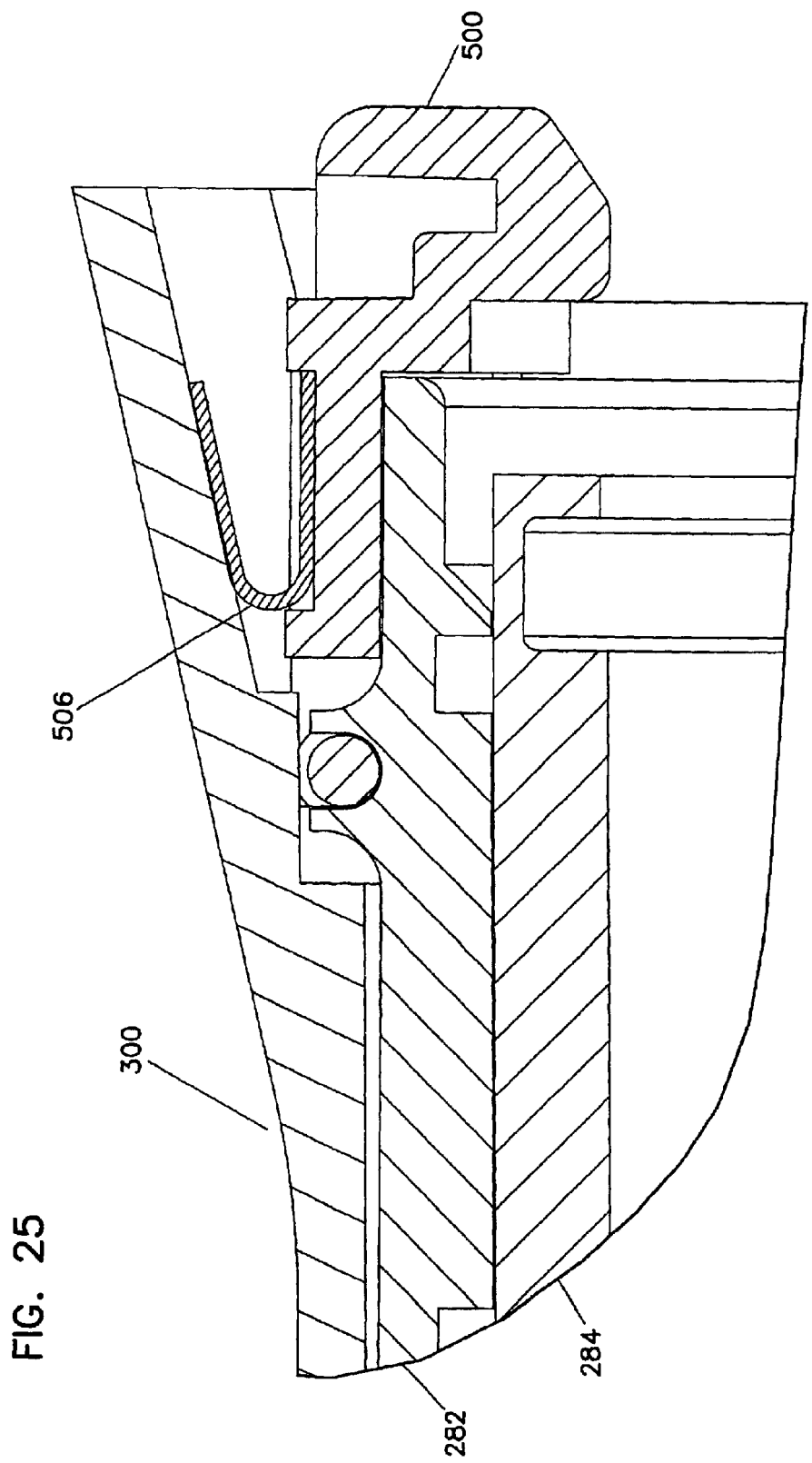
FIG. 25 is a partial cross-sectional view of the fluid dispensing assembly of FIG. 19.

FIG. 24 illustrates a fluid dispensing assembly where the locking member 500 is biased in a released configuration and the handle 400 is rotated actuating both the coupler valve and closure valve to an open configuration relative to the housing and the closure body, respectively. The assembly is shown in an open configuration. FIG. 25 illustrates the locking member 500 biased in a locked position.

As shown in FIG. 26, the closure is illustrated as oriented in-line. This orientation may allow and closure valve of the closure to be removed, thereby allowing a fluid source to be filled through the closure body with the closure body forming a part of the fluid source 600. The closure valve may be provided with a diameter suitable for filling a fluid source from a bulk fluid supply.

As discussed above, the present invention offers many advantages. For instance, interlock features of the closure and the coupler allow for a secure connection of the fluid dispensing assembly preventing the closure and the coupler from pulling apart when in an open configuration. Also, the locking member feature provides an anti-rotation interlock so as to prevent the coupler from being rotated out of a closed configuration when not connected to a closure. Furthermore, the locking member may be released to allow opening of the coupler when the coupler is attached to the closure. Also, the locking member locks the coupler in its uncoupled state and ensures proper orientation is preserved between the coupler and the closure in their closed positions. Locking the coupler in the closed position prevents air from being introduced into the dispensing system and fluid from draining from a line going to the coupling. The in-line orientation of the closure and that the closure may be a part of the fluid source allows for the ability to fill the fluid source through the closure.

The foregoing descriptions of the preferred embodiments of the invention have been presented for the purposes of illustration and description. They are not intended to be exhaustive or to limit the invention to the precise forms disclosed. Many modifications and variations are possible in light of the above teachings.

We claim:

1. A coupler apparatus, comprising:

a housing; said housing including a first end and a second end, and an opening on a sidewall of said housing;

a coupler valve rotatably connected with said housing in a fluid tight seal; said coupler valve including a first end and a second end, and an opening on a sidewall of said coupler valve;

said first end including a handle for rotating said coupler valve relative to said housing to enable an open position and a closed position of said coupler apparatus; said second end being operatively connectable to a piece of dispensing valve equipment;

said openings corresponding with each other in said open position and said openings being blocked by said sidewalls in said closed position; and a locking member operatively connected to said housing; said locking member maintaining said coupler apparatus in said closed position when said coupler apparatus is in an uncoupled state, and said locking member being releasable when said coupler apparatus is coupled to said piece of dispensing valve equipment.

2. The coupler apparatus according to claim 1, wherein said opening of said housing being suitable for connection to a fluid line.

3. The coupler apparatus according to claim 1, wherein said locking member being biased into a normally closed position when said coupler apparatus is in said uncoupled state.

4. The coupler apparatus according to claim 3, wherein said locking member is spring biased.

5. The coupler apparatus according to claim 1, wherein said locking member including a protrusion; said protrusion being contactable with a piece of fluid dispensing equipment so as to release said locking member.

6. The coupler apparatus according to claim 1, wherein said second end of said housing including at least one stop and said coupler valve including at least one stop; said stops of said housing and coupler valve communicating to provide proper rotation between said housing and said coupler valve.

7. The coupler apparatus according to claim 1, wherein said piece of dispensing valve equipment including a closure having a fitment connectable to a fluid source.

8. A fluid dispensing valve assembly, comprising:

a closure including a closure body having a first end and a second end and an opening on a sidewall of said closure body; said second end having a fitment connectable to a fluid source; a closure valve rotatably connected with said closure body in a fluid tight seal; said closure valve having a first end and a second end, and said opening on a sidewall of said closure valve; and said closure valve being removable from said closure body enabling filling of an fluid source through said closure body;

a coupler rotatably connected with said closure; said coupler including a housing having a first end and a second end; said housing having an opening on a sidewall of said housing; a coupler valve rotatably connected with said housing in a fluid tight seal; said coupler valve having a first end and a second end, and an opening on a sidewall of said coupler valve; said first end having a handle;

wherein said first end of said coupler valve including an interlock cooperating with an interlock of said first end of said closure valve; said interlocks being operatively connected with said handle of said coupler enabling said fluid dispensing valve assembly to be actuatable into an open position where said openings of said coupler and closure correspond with each other, and into a closed position where said openings of said coupler and closure are blocked by said respective sidewalls of said coupler and closure.

9. The fluid dispensing valve assembly according to claim 8, wherein said closure body and said closure valve being in an in-line orientation enabling in-line filling of said fluid source when said closure valve is removed from said closure body.

10. The fluid dispensing valve assembly according to claim 8, wherein said fitment is a flange forming an integral part of said fluid source.

11. The fluid dispensing valve assembly according to claim 10, wherein said fitment is a weld flange.

12. The fluid dispensing valve assembly according to claim 8, wherein said first end of said closure body including a stop portion and said closure valve including a stop portion, said stop portion of said closure body, and said stop portion of said closure valve communicating to provide proper rotation between said closure body and said closure valve.

13. The fluid dispensing valve assembly according to claim 8, wherein said closure body including a tear away seal covering said opening of said closure body before use.

14. The fluid dispensing valve assembly according to claim 8, wherein said housing including a locking member operatively connected with said housing; said locking member maintaining said coupler in closed position when said coupler is in an uncoupled state, and said locking member being releasable when said coupler is connected with said closure.

15. The fluid dispensing valve assembly according to claim 14, wherein said locking member being released by contacting a receiving area of said closure when said coupler and closure are connected.

16. The fluid dispensing valve assembly according to claim 15, wherein said receiving area being a activating ramp.

17. The fluid dispensing valve assembly according to claim 15, wherein said locking member including a protrusion; said protrusion being contactable with said receiving area to release said locking member.

18. The fluid dispensing valve assembly according to claim 14, wherein said locking member being biased by a biasing member into a normally closed position when said coupler is in said uncoupled state.

19. The fluid dispensing valve assembly according to claim 18, wherein said biasing member is a spring.

20. The fluid dispensing valve assembly according to claim 8, wherein said second end of said closure body including an interlock and said second end of said housing including an interlock; said interlocks cooperatively engaged to prevent said coupler and said closure from pulling apart.

21. The fluid dispensing valve assembly according to claim 8, wherein said interlock of said first end of said coupler valve is an internal space of said handle; said internal space cooperative with said interlock of said first end of said closure valve.

22. The fluid dispensing valve assembly according to claim 14, wherein said biasing member is biased against a shroud; said shroud including a surface for biasing support of said biasing member and substantially covers said coupler and closure.

23. The fluid dispensing valve assembly according to claim 22, wherein said shroud including a handle operatively connected and rotatable with said shroud; said handle being operatively connected with said handle of said coupler valve and said interlocks at said first ends of said coupler valve and closure valve, such that said handle of said shroud enabling said fluid dispensing valve assembly to be actuatable into said open and closed positions.

\* \* \* \* \*